(12) United States Patent
Mickeal et al.

(10) Patent No.: US 11,622,089 B2
(45) Date of Patent: Apr. 4, 2023

(54) METHOD AND APPARATUS FOR CONTROLLED ONLINE DEBATE

(71) Applicant: Debate Me Now Technologies, Inc., Encino, CA (US)

(72) Inventors: Jeffrey M. Mickeal, Encino, CA (US); John W. Kopcha, Monrovia, CA (US); Trevor Downs, Monrovia, CA (US)

(73) Assignee: Debate Me Now Technologies, Inc., Encino, CA (US)

( * ) Notice: Subject to any disclaimer, the term of this patent is extended or adjusted under 35 U.S.C. 154(b) by 0 days.

(21) Appl. No.: 17/005,123

(22) Filed: Aug. 27, 2020

(65) Prior Publication Data

US 2021/0258536 A1    Aug. 19, 2021

Related U.S. Application Data

(60) Provisional application No. 62/892,498, filed on Aug. 27, 2019.

(51) Int. Cl.
*H04N 7/14* (2006.01)
*H04N 5/76* (2006.01)

(52) U.S. Cl.
CPC .............. *H04N 7/141* (2013.01); *H04N 5/76* (2013.01)

(58) Field of Classification Search
CPC combination set(s) only.
See application file for complete search history.

(56) References Cited

U.S. PATENT DOCUMENTS

| | | | |
|---|---|---|---|
| 2006/0115062 A1* | 6/2006 | Gonder | H04M 15/8292 379/142.01 |
| 2008/0184122 A1* | 7/2008 | Grant | G06Q 10/10 715/723 |
| 2012/0226997 A1* | 9/2012 | Pang | H04L 12/1818 715/753 |
| 2013/0215215 A1* | 8/2013 | Gage | H04N 7/15 348/14.08 |
| 2014/0344359 A1* | 11/2014 | Broz | H04L 51/32 709/204 |
| 2018/0060883 A1* | 3/2018 | Cheesman | H04L 67/306 |
| 2018/0268072 A1* | 9/2018 | Rathod | G06F 16/9535 |
| 2019/0297367 A1* | 9/2019 | Osminer | H04N 21/8133 |
| 2019/0306208 A1* | 10/2019 | Robinson | H04L 67/10 |

* cited by examiner

*Primary Examiner* — Phung-Hoang J Nguyen
(74) *Attorney, Agent, or Firm* — Foundation Law Group LLP; J D Harriman

(57) ABSTRACT

The system provides a method and apparatus for automatically constructing, controlling, curating, recording, displaying, and preserving a discussion between one, two or more users on a topic. The system is an automated debate moderator that provides muting, time limits, number of rounds, round duration countdown, order of speaking, and end time that can be accessed via any processing device, including smartphones, tablets, desktops, laptops, and the like. The topics can be self-generated or selected from a list of curated topics and the resulting recorded debate can be linked to on any social network or media viewing platform.

9 Claims, 7 Drawing Sheets

METHOD AND APPARATUS FOR CONTROLLED ONLINE DEBATE

This patent application claims priority to U.S. Provisional Patent Application No. 62/892,498 filed on Aug. 27, 2019, which is incorporated by reference herein in its entirety.

BACKGROUND OF THE SYSTEM

The ability to interact and create original content with others via video using smartphones, tablets and laptops has grown exponentially. Many users take advantage of video communication techniques such as facetime, video conferencing, and the like to communicate with others. In addition, it is possible to communicate asynchronously using video clips through messaging apps, social media platforms and the like.

Users are also having discussions, whether via text, audio, or video, about many topics. Often these have the feel of debate, but are uncontrolled and often go off on tangents or unrelated subjects. There is a disadvantage on the Internet that there are no means moderating debates and discussions on the web.

SUMMARY

The system provides a method and apparatus for automatically constructing, controlling, curating, recording, displaying, and preserving a discussion between one, two or more users on a topic. The system is an automated debate moderator that provides opponent muting, time limits, number of rounds, round duration countdown order of speaking, and end time that can be accessed via any processing device, including smartphones, tablets, desktops, laptops, and the like. The topics can be self-generated or selected from a list of curated topics and the resulting recorded debate can be linked to any social network or media viewing platform. The system allows for voting by third parties to show which side of the debate the voter favors.

DETAILED DESCRIPTION OF THE SYSTEM

Figure 1:
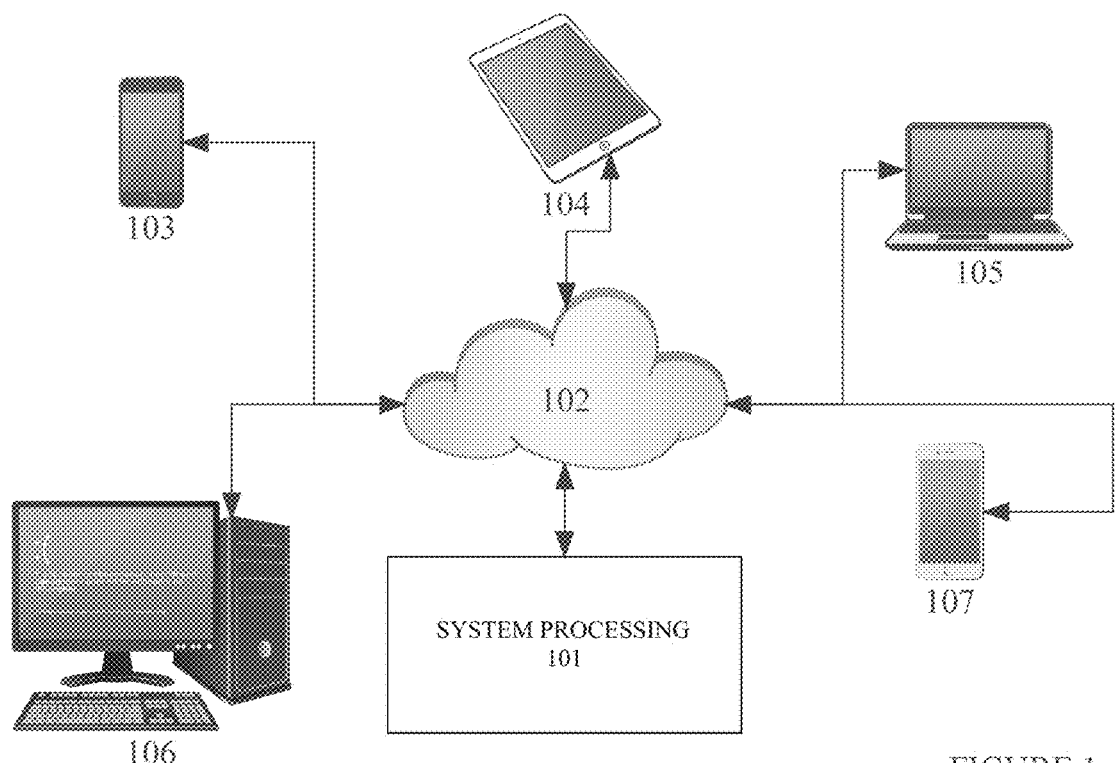
FIG. 1 is a block diagram of an embodiment of the system.

The system provides a method and apparatus for automatically constructing, controlling, curating, recording, displaying, and preserving a discussion between one, two or more users on a topic. FIG. 1 is a block diagram of an embodiment of the system. The system provides a system processing function 101 which may be a central server, cloud processing, AWS implementation, distributed processing, and the like. The system communicates with a plurality of users on processing devices through a network such as the Internet 102. Users can access the system through smartphones 103, 107, tablets 104, laptops 105, or desktop systems 106. The user device should have wi-fi and/or cellular capabilities and video capabilities including a camera and microphone.

In operation, the system allows a first user to suggest a debate topic and offer to debate a second user or to offer the debated topic to one or more of a plurality of users. This part of the operation take place asynchronously. When a user chooses a topic and offers the debate to others, an active session is created. This session can remain active until the completion of the debate with an invited user. The system allows for other non-participating debaters to watch the live debate in-progress and those watchers may vote for a winner of the debate, upvote the entire debate, leave comments, and the like. In one embodiment, the remaining invitations become inactive once the first invited user responds. In one embodiment, the remaining invitations remain active and the first user may engage in debates with any invited user who accepts.

The first user may have a series of debates with any user who accepts the topic. The system then allows the first user to record a video making an argument regarding the topic. The system has an automatic timer which includes a visible countdown while the first user is making their statement. The system automatically stops recording when the time is up and sends the second user a notification with the first user's video attached to watch. The second user is then prompted to record or upload their rebuttal which they can do directly after watching the video or at any time they like. Once the second user has recorded their rebuttal to the original statement the first user is notified and they are then offered the same options to record their second statement. This continues until all the rounds are completed. Once all the rounds are completed the debate is processed and edited together in one full length video encompassing all recorded rounds of both users in order.

In one embodiment, the debate takes place live in realtime. The system mutes each user when it is not their time to speak, but continues to video them so that reactions are recorded and can be seen. At the end of the debate, the system processes and stores the discussion, allowing it to be replayed, shared, transmitted, with available links to post on social media. In one embodiment, during playback the system can present different presentations of the video depending on who is speaking. The system may be split screen left and right or top and bottom, or the image of the non-speaking user will be in a small inset screen on the display.

In embodiment, the system allows a user to select the number of rounds of the debate as well as the length of each round. In addition, the system may support a two-person debate or multi-person debate with three or more participants.

The system allows the selection of themes for the debate. A theme represents the graphics, font, and other graphical items used in association with the video. The theme may include sports type logos for the participants and may change based on the speaker. The themes may include upvote and downvote buttons so that future viewers can indicate who "won" the debate. Users will have the ability to "follow" other users and will be automatically notified by text or e-mail when new debates are posted by users that they "follow". Completed debates are stored at a central website and can be searched, watched, voted, scored, and the like by users. In one embodiment, the debates are also published to a video viewing site such as YouTube.

In one embodiment, the system may include advertising between the rounds. In addition, a user may choose to end a round before the timer expires, and the system permits such action.

Figure 2A:
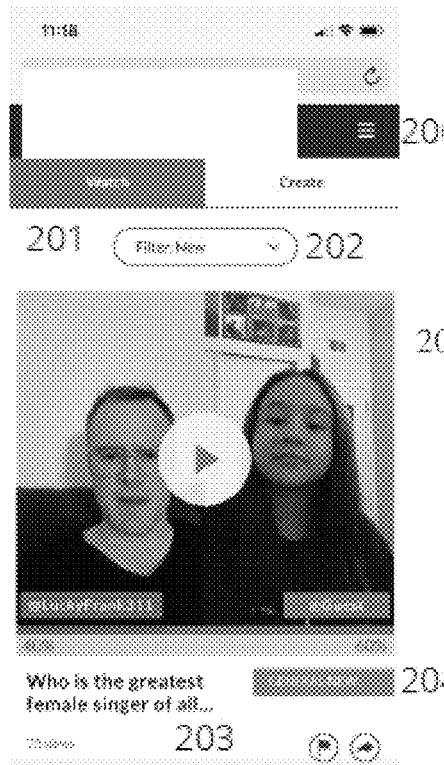
FIG. 2A illustrates an interface of an embodiment of the system.
Figure 2B:
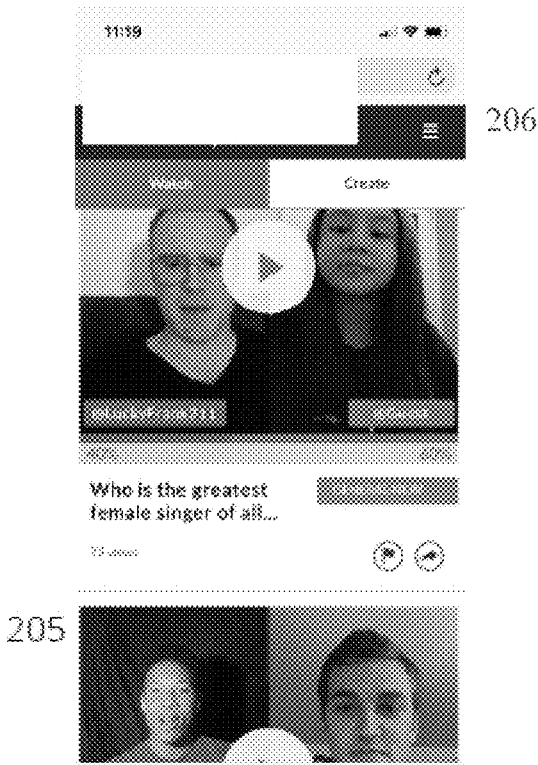
FIG. 2B illustrates the scroll region 205 of FIG. 2A in an embodiment of the system.

FIGS. 2A and 2B are an example of an interface in an embodiment of the system on a mobile phone. The display 200 includes buttons to watch a debate 201 or to create a debate 202. The page is populated with completed debates such as "Who is the greatest female singer of all time" 203 in the "General" category 204. There are a number of categories that a user can select for debate topics, including; Contest, Parenting, Sports (including sub-categories for individual sports and leagues), Education, Science, Social Justice, Relationships, Technology, Health and Wellness, Philosophy, Pop Culture, Politics, Product Reviews, Finance, Real Estate, Performance Duels, Life Choices, Entertainment, Hot Topics, Supernatural, Alcohol, Religion, General Discussion, Food, and the like.

The completed debates are scrollable, for example the upper portion of a next debate 205 is partially visible in FIG. 2B. The system includes Settings 206 that allow a user to modify their profile, request customer service, select search filters to search for specific debates by user, topic, genre, and the like.

Figure 3:
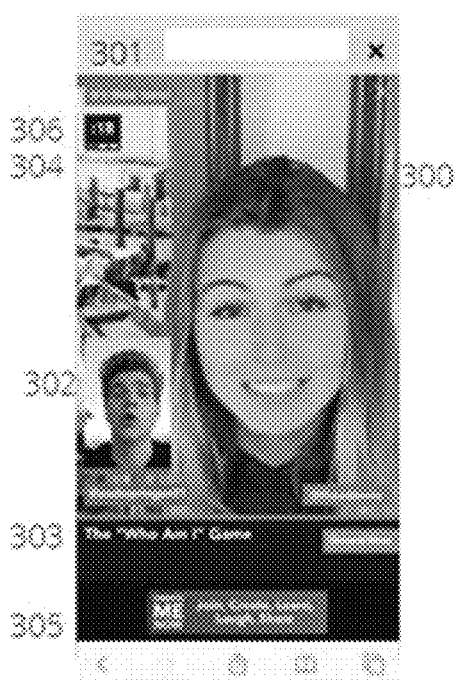
FIG. 3 illustrates an interface of a debate in an embodiment of the system.

FIG. 3 illustrates an interface of a debate in progress in an embodiment of the system. The display 300 shows the current speaker in large format 301. The muted, other debater is shown live in inset 302. The Topic is shown in screen region 303, with region 304 being a "scoreboard" showing the number of rounds, the length of each round, and highlighting the current round. Region 305 may show advertising as desired and region 306 shows the remaining time of the round so the speaker can know when to end.

Figure 4:
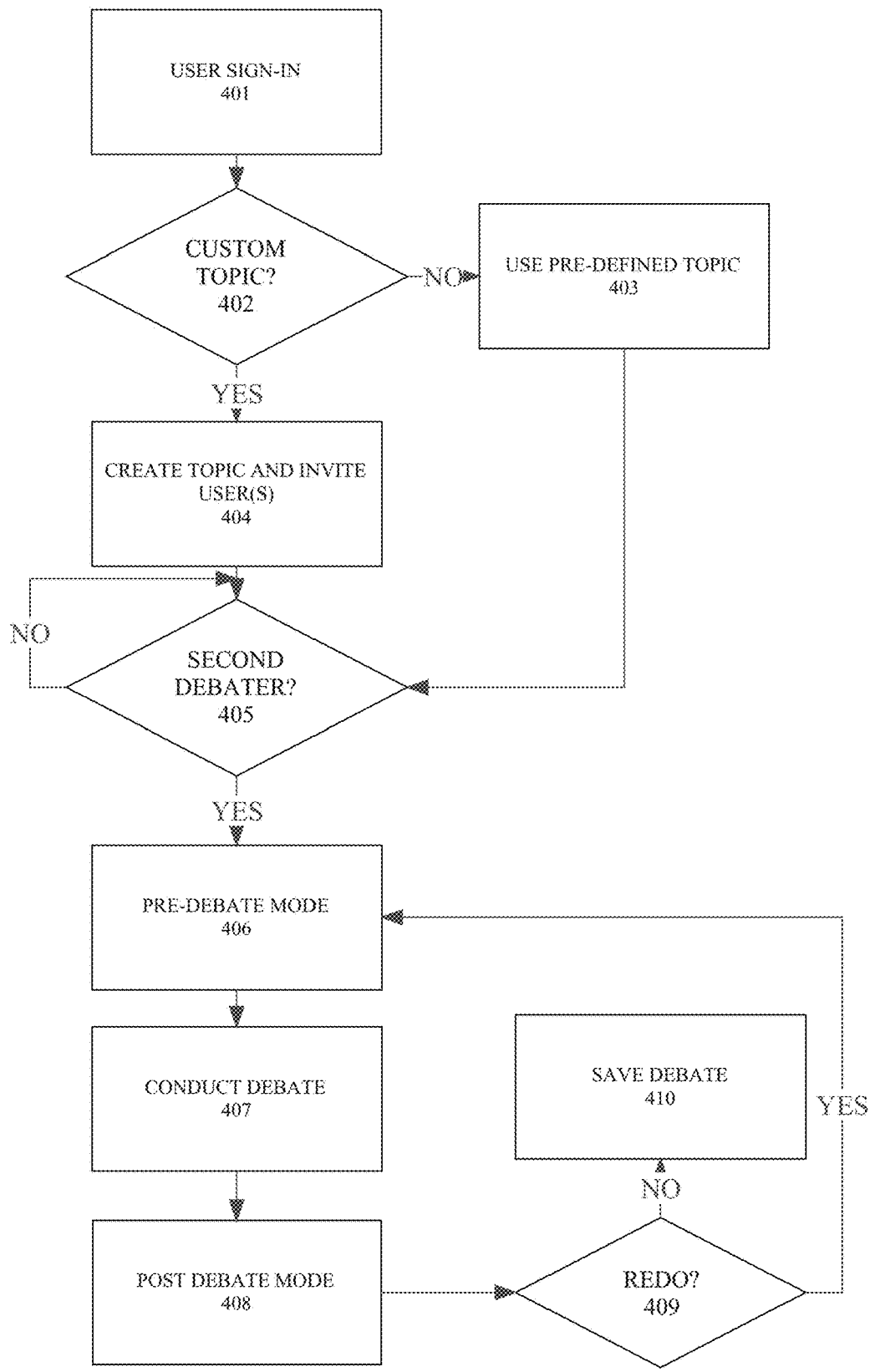
FIG. 4 is a flow diagram illustrating the operation of a debate in an embodiment of the system.

FIG. 4 is a flow diagram illustrating the operation of the system in one embodiment. At step 401 a user signs-in to the system. At decision block 402 it is determined if the use wants to use a custom topic. If not, the system proceeds to step 403 and the user selects a pre-defined topic from choices offered by the system. If the user desires a custom topic at step 402, the system proceeds to step 404 and the user creates the custom topic and invites one or more users to participate in the debate.

The user who has selected the topic may invite one or more friends to debate the topic. Alternatively, the topic may be offered to all uses of the system and any may choose to participate. At decision block 405 it is determined if at least a second user has selected the topic and elected to participate in the debate. If not, the system continues to wait at step 405.

When a second user has accepted the debate topic at step 405, the system proceeds to step 406, which is a pre-debate mode. In this mode, the system acts similar to a facetime call with both users able to speak without muting. An icon will also appear on the topic chooser's display that starts the debate when activated. During the pre-debate mode, the debaters may agree on the number of rounds, length of each round, and generally discuss the upcoming debate.

Figure 7:
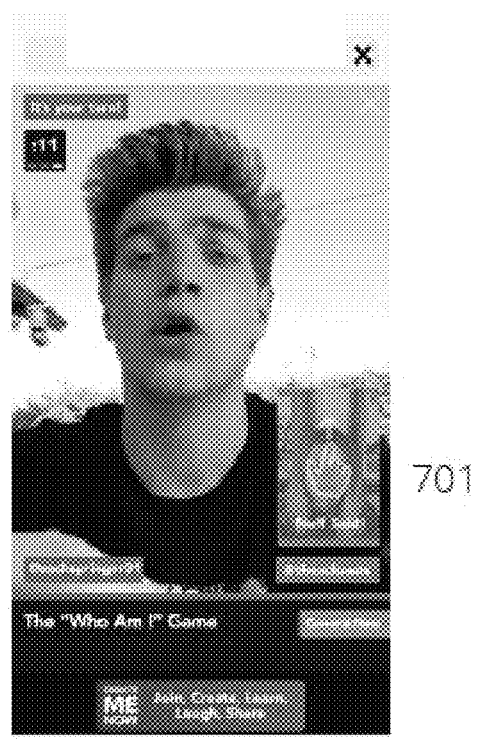
FIG. 7 illustrates a method to end a round early in an embodiment of the system.

When the topic chooser activates the start debate icon, the system proceeds to step 407 and the debate begins. As noted above, when one user speaks, the other is muted, although still visible in one embodiment. Each user has a "Stop" or "End" icon that allows them to end their round prior to the end of the countdown timer if desired. In one embodiment illustrated in FIG. 7, the user can end the round early by tapping on and swiping up on the other debater's image at 701. It should be noted this action could be undertaken in different methods in certain embodiments including but not limited to double tapping, holding, single tapping, motion gestures, and other potential methods of user input to indicate a desire to end the round early.

Figure 6:
FIG. 6 illustrates an advertisement region in an embodiment of the system.

In one embodiment, advertising could be provided between rounds such as illustrated in FIG. 6. The ad may be shown on most of the display 601 with the debate topic still showing at region 303.

After the debate has ended, the system proceeds to a Post-Debate mode 408. In this mode the system provides interactive communication between the debaters without muting (similar to a video call) so that the debaters can discuss the debate and see if they each are satisfied with the result. The system offers an opportunity to redo the debate if desired at decision block 409. If they choose redo, the system returns to pre-debate mode at step 406. In one embodiment, the system allows any of the rounds to be replaced one by one, or the entire debate is re-done.

If no redo is desired, the system proceeds to step 410, saves the video of the debate, and makes it available on the system. At this time or any time, the participants may share the video on social media, linked integrations, via posting a link, text messaging, email, and the like.

The videos are saved in a database that can be in the cloud or at a central storage location. The videos each include metadata to assist in searching and filtering including the names of the debaters, the topic category, scoring, likes, views, date, region, and the like.

Figure 5:
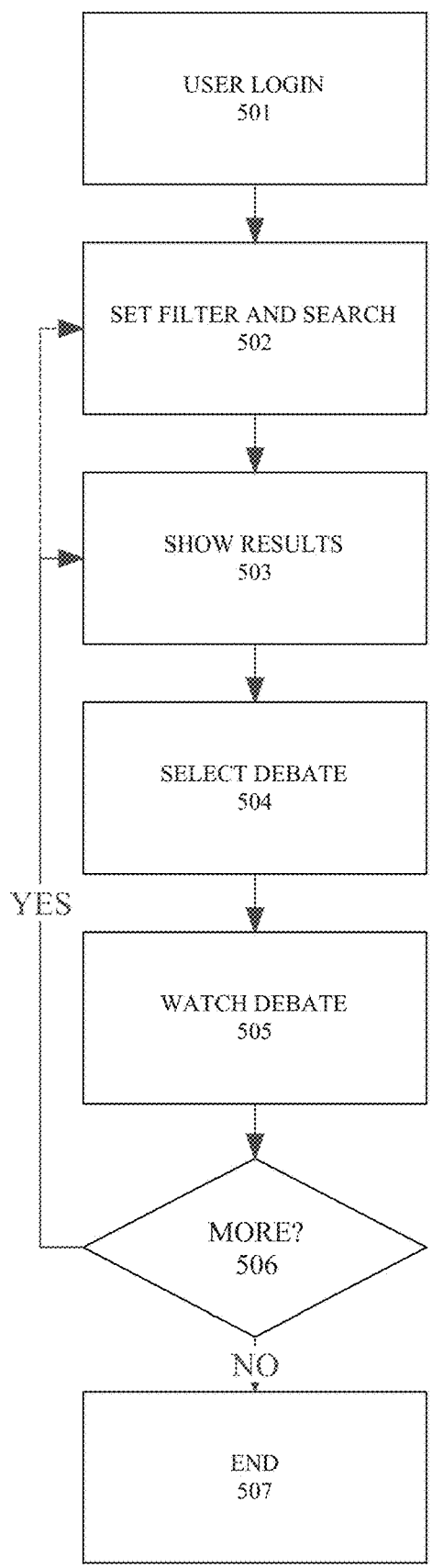
FIG. 5 is a flow diagram illustrating selecting an existing debate in an embodiment of the system.

FIG. 5 is a flow diagram illustrating selecting an existing debate in an embodiment of the system. At step 501 a user logs in to the system or as a guest user. At step 502 the user sets options in a search filter to find debates of interest. The user may choose by genre, keyword, user, most popular, date, and the like. When the user has set the filter the system searches for matching debates.

At step 503 the system displays the results of the search to the user. This may be in a scrolling list that the user can scan through, in tiles, by title, and the like. The search results may be re-ordered by the user as desired, such as alphabetical order, date order (and reverse order), and the like. At step 504 the user selects a debate and watches the debate at step 505. While watching the user may vote for a winner of the debate, upvote the entire debate, leave comments, and the like. In one embodiment the user is presented with a "like" or "thumbs-up" icon below each debater that allows the user to vote for that debater. In one embodiment the icons and/or voting region have different colors for each debater. The user can provide comments by selecting a comment icon or by adding text to a displayed text box. The user could also upvote the entire debate. The system may allow filtering of debates by ranking, number of upvotes, and the like.

At decision block 506 it is determined if the user wants to watch more debates. If not, the system ends at step 507. If so, the system returns to the search results at step 503 or optionally to the filter at step 502.

In one embodiment users are able to re-record either side of a pre-existing debate effectively updating a portion of the previous user's video. The user can choose to replace either the starter or joiner's segments and they will have their own debate video created separately from the original. Subsequently, a user viewing the debate with the replaced side can also choose to replace either side of the debate.

Figure 8:
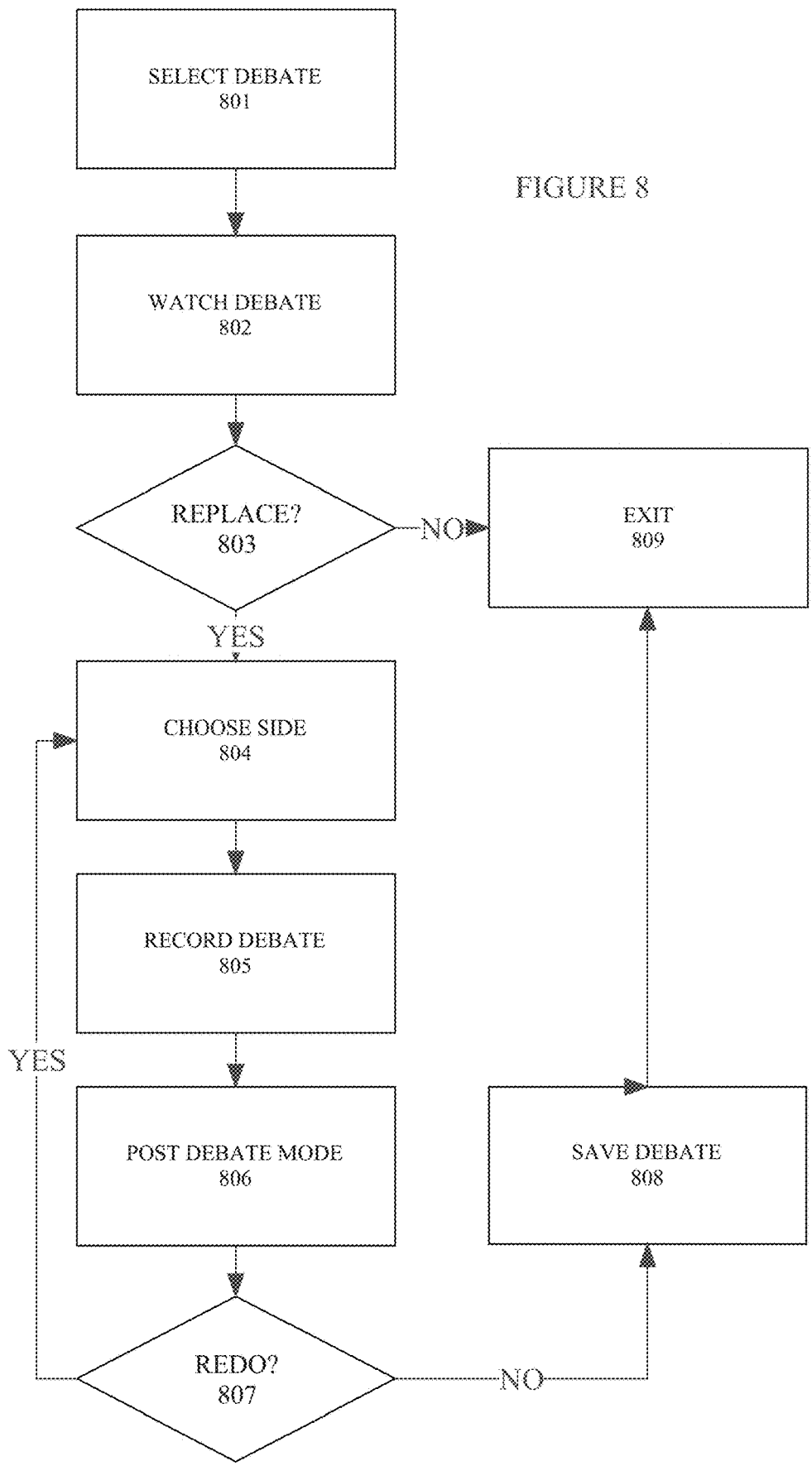
FIG. 8 is a flow diagram illustrating the replacement of one or more sides in a pre-existing debate in an embodiment of the system.

FIG. 8 is a flow diagram illustrating the replacement of one or more sides in a pre-existing debate in an embodiment of the system. At step 801 the user selects a debate to watch. At step 802 the user watches the debate. At decision block 803 it is determined if the user wants to replace one of the sides in the debate. If yes, the system proceeds to step 804 and the user chooses the side to be replaced. If no, the system exits at step 809.

At step 805 the user records the side of the debate that was chosen at step 804. During the recording the original opposing side will be displayed to the user similarly to the steps in FIG. 4. Ads may appear in between rounds as well. After recording the revised debate the user proceeds to step 806 and enters post-debate mode. In this mode the user is offered the chance to redo the video at step 807. If the user decides to redo the video at step 807 the system proceeds to step 804 where the user can choose a different side, or keep the same side and then proceed to record the debate again at step 805. If the user chooses to not redo the video at step 807 the system saves the debate at 808 and exits at step 809.

Figure 10:
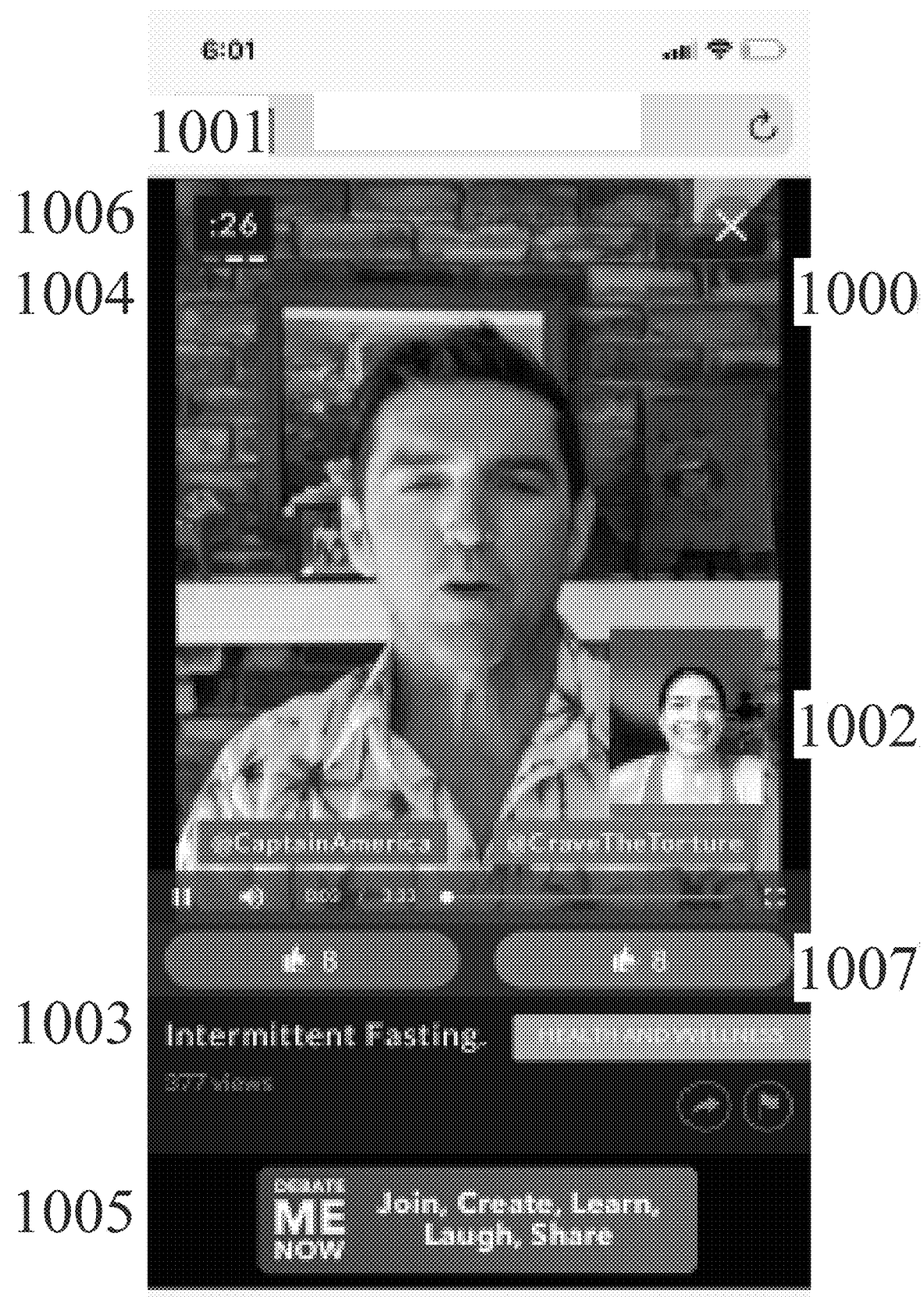
FIG. 10 illustrates the interface of the display when watching a previously recorded debate.

FIG. 10 illustrates the interface of the display when watching a previously recorded debate. The display 1000 shows the current speaker in large format 1001. The other debater is shown in inset 1002. The viewer sees the reactions that the other debater had when the debate was recorded. The Topic is shown in screen region 1003, with region 1004 being a "scoreboard" showing the number of rounds, the length of each round, and highlighting the current round. Region 1005 may show advertising as desired and region 1006 shows the remaining time of the round. Region 1007 includes voting buttons so that the viewer can vote for one side of the debate or the other. In one embodiment, the system contemplates viewers being able to watch a debate in progress and using voting buttons to vote for the debaters in real time.

In one embodiment users will be given platform specific credits for receiving votes, creating debates, voting on debates, watching debates and other platform activities. They will then be able to use these credits in their own debates or give them to others as a show of support. Users will also be given the chance to purchase credits and give them to other users. Credits hold no monetary value in one embodiment. User status earned by receiving credits will offer users access to premium features and unique tools that will help them be more effective or creative in future debates.

Example Computer System

Figure 9:
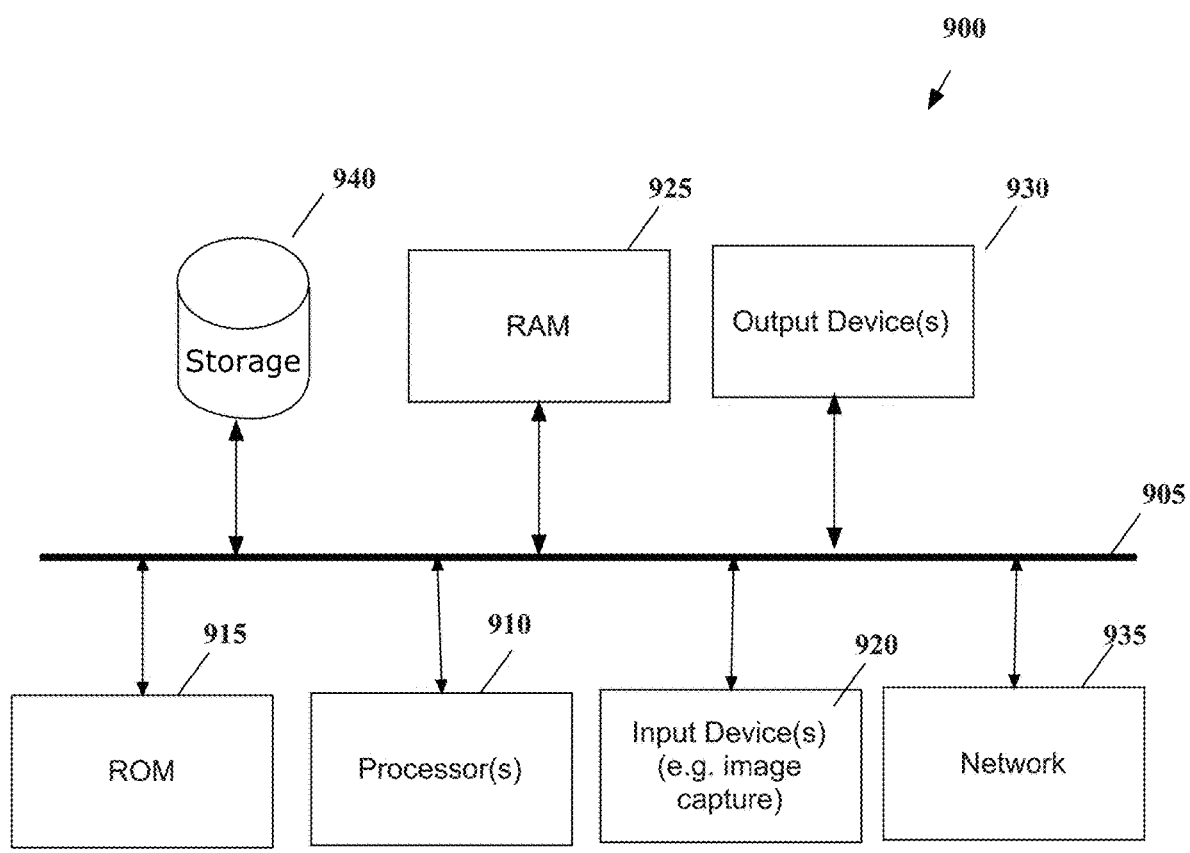
FIG. 9 is an example computer system to implement the system in an embodiment.

FIG. 9 illustrates an exemplary a system 900 that may implement the system. The electronic system 900 of some embodiments may be a mobile apparatus. The electronic system includes various types of machine-readable media and interfaces. The electronic system includes a bus 905, processor(s) 910, read only memory (ROM) 915, input device(s) 920, random access memory (RAM) 925, output device(s) 930, a network component 935, and a permanent storage device 940.

The bus 905 communicatively connects the internal devices and/or components of the electronic system. For instance, the bus 905 communicatively connects the processor(s) 910 with the ROM 915, the RAM 925, and the permanent storage 940. The processor(s) 910 retrieve instructions from the memory units to execute processes of the invention.

The processor(s) 910 may be implemented with one or more general-purpose and/or special-purpose processors. Examples include microprocessors, microcontrollers, DSP processors, and other circuitry that can execute software.

Alternatively, or in addition to the one or more general-purpose and/or special-purpose processors, the processor may be implemented with dedicated hardware such as, by way of example, one or more FPGAs (Field Programmable Gate Array), PLDs (Programmable Logic Device), controllers, state machines, gated logic, discrete hardware components, or any other suitable circuitry, or any combination of circuits.

Many of the above-described features and applications are implemented as software processes of a computer programming product. The processes are specified as a set of instructions recorded on a machine readable storage medium (also referred to as machine readable medium). When these instructions are executed by one or more of the processor(s) 910, they cause the processor(s) 910 to perform the actions indicated in the instructions.

Furthermore, software shall be construed broadly to mean instructions, data, or any combination thereof, whether referred to as software, firmware, middleware, microcode, hardware description language, or otherwise. The software may be stored or transmitted over as one or more instructions or code on a machine-readable medium. Machine-readable media include both computer storage media and communication media including any medium that facilitates transfer of a computer program from one place to another. A storage medium may be any available medium that can be accessed by the processor(s) 910. By way of example, and not limitation, such machine-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a processor. Also, any connection is properly termed a machine-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects machine-readable media may comprise non-transitory machine-readable media (e.g., tangible media). In addition, for other aspects machine-readable media may comprise transitory machine-readable media (e.g., a signal). Combinations of the above should also be included within the scope of machine-readable media.

Also, in some embodiments, multiple software inventions can be implemented as sub-parts of a larger program while remaining distinct software inventions. In some embodiments, multiple software inventions can also be implemented as separate programs. Any combination of separate programs that together implement a software invention described here is within the scope of the invention. In some embodiments, the software programs, when installed to operate on one or more electronic systems 900, define one or more specific machine implementations that execute and perform the operations of the software programs.

The ROM 915 stores static instructions needed by the processor(s) 910 and other components of the electronic system. The ROM may store the instructions necessary for the processor(s) 910 to execute the processes provided by the system. The permanent storage 940 is a non-volatile memory that stores instructions and data when the electronic system 900 is on or off. The permanent storage 940 is a read/write memory device, such as a hard disk or a flash drive. Storage media may be any available media that can be accessed by a computer. By way of example, the ROM could also be EEPROM, CD-ROM or other optical disk storage, magnetic disk storage or other magnetic storage devices, or any other medium that can be used to carry or store desired program code in the form of instructions or data structures and that can be accessed by a computer.

The RAM 925 is a volatile read/write memory. The RAM 925 stores instructions needed by the processor(s) 910 at runtime, the RAM 925 may also store the real-time video or still images acquired by the system. The bus 905 also connects input and output devices 920 and 930. The input devices enable the user to communicate information and select commands to the electronic system. The input devices 920 may be a keypad, image capture apparatus, or a touch screen display capable of receiving touch interactions. The output device(s) 930 display images generated by the electronic system. The output devices may include printers or display devices such as monitors.

The bus 905 also couples the electronic system to a network 935. The electronic system may be part of a local area network (LAN), a wide area network (WAN), the Internet, or an Intranet by using a network interface. The electronic system may also be a mobile apparatus that is connected to a mobile data network supplied by a wireless carrier. Such networks may include 3G, HSPA, EVDO, and/or LTE.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other apparatuses, devices, or processes. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 18(f) unless the element is expressly recited using the phrase "means for" or, in the case of a method claim, the element is recited using the phrase "step for."

Thus, a method and apparatus for automatically moderated debates has been described.

What is claimed is:

1. A method of automatically providing a moderated debate comprising:
   in a system processing device having a network connection,
   providing a method for a first debater to choose a topic and use a first debater communication device in communication with the system processing device to send an invitation to a plurality of second debaters to join the debate, wherein each of the plurality of second debaters can choose to decline the invitation;
   making the invitation inactive to all but a second debater of the plurality of second debaters who accepts the invitation using a second debater communication device in communication with the system processing device to a live video debate,
   providing a method for the first debater to argue the topic via live video with the second debater for a first timed duration and for the system processing device to automatically mute the second debater during the first timed duration;
   providing a method for the second debater to argue the topic via live video with the first debater for a second timed duration and for the system processing device to automatically mute the first debater during the second timed duration;
   providing a method to record and save the debate video to a storage device; and the debater, via voting procedure, receiving platform specific credits for access use to premium features and unique tools to be more effective or creative in future debates.

2. The method of claim 1 wherein the first debater communication device is a smartphone.

3. The method of claim 2 further including providing a method for the first debater to argue the topic for a third timed duration and to mute the second debater during the third timed duration.

4. The method of claim 3 further including providing a method for the second debater to argue the topic for a fourth timed duration and to mute the first debater during the fourth timed duration.

5. The method of claim 4 further including providing a method for a viewer to view the saved debate.

6. The method of claim 5 further including providing a method for the viewer to vote for the first or second debater.

7. The method of claim 6 further including providing a method for sharing the stored debate on social media.

8. The method of claim 7 further wherein the social media is YouTube.

9. The method of claim 1 wherein the first and second debater can redo the debate before saving it to storage.

* * * * *